(12) United States Patent
Park et al.

(10) Patent No.: US 10,297,846 B2
(45) Date of Patent: May 21, 2019

(54) OPERATION CONTROL METHOD OF FUEL CELL SYSTEM

(71) Applicants: Hyundai Motor Company, Seoul (KR); Kia Motors Corporation, Seoul (KR)

(72) Inventors: Hyo Jin Park, Gyeonggi-do (KR); Bon Yong Koo, Seoul (KR); Sang Soo Eun, Gyeonggi-do (KR); Ki Chang Kim, Seoul (KR); Seong Cheol Jeong, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 14/946,039

(22) Filed: Nov. 19, 2015

(65) Prior Publication Data

US 2016/0351929 A1    Dec. 1, 2016

(30) Foreign Application Priority Data

Jun. 1, 2015 (KR) .................. 10-2015-0077052

(51) Int. Cl.
*H01M 8/04089* (2016.01)
*H01M 8/04992* (2016.01)
(Continued)

(52) U.S. Cl.
CPC ..... *H01M 8/04992* (2013.01); *H01M 8/0438* (2013.01); *H01M 8/04089* (2013.01); *H01M 8/0491* (2013.01); *H01M 8/0494* (2013.01); *H01M 8/04388* (2013.01); *H01M 8/04425* (2013.01); *H01M 8/04559* (2013.01);
(Continued)

(58) Field of Classification Search
CPC ....... H01M 8/04298–8/04992; H01M 8/04089
See application file for complete search history.

(56) References Cited

FOREIGN PATENT DOCUMENTS

JP          2002-352833 A       12/2002
JP          2002352826 A  *    12/2002
(Continued)

OTHER PUBLICATIONS

Machine Translation of JP 2002-352826 originally published Dec. 2002 to Kobayashi.*

*Primary Examiner* — Jonathan G Leong
(74) *Attorney, Agent, or Firm* — Mintz Levin Cohn Ferris Glovsky and Popeo, P.C.; Peter F. Corless (57) ABSTRACT

An operation control method of a fuel cell system is provided that increases the output of a fuel cell stack by detecting and overcoming the cause of a performance limit when the stack reaches the performance limit during high-altitude operation of a fuel cell vehicle, thereby achieving higher stack performance and vehicle power performance. The method includes determining whether an operation state of the stack corresponds to a predetermined condition in which a stack output limit occurs by determining current operation state information of the stack. Additionally, operating pressure of an air pole is adjusted by changing an opening degree of an air pressure adjusting valve to a control command value based on the operation state of the stack when the operation state corresponds to the predetermined condition in which the stack output limit occurs.

8 Claims, 8 Drawing Sheets (51) Int. Cl.
*H01M 8/04746* (2016.01)
*H01M 8/0438* (2016.01)
*H01M 8/04537* (2016.01)
*H01M 8/04858* (2016.01)
*H01M 8/04828* (2016.01)

(52) U.S. Cl.
CPC ... *H01M 8/04589* (2013.01); *H01M 8/04619* (2013.01); *H01M 8/04753* (2013.01); *H01M 2250/20* (2013.01); *Y02T 90/32* (2013.01)

(56) References Cited

FOREIGN PATENT DOCUMENTS

| | | |
|---|---|---|
| JP | 2003-168467 A | 6/2003 |
| JP | 2007-087811 A | 4/2007 |
| JP | 2008-091257 A | 4/2008 |
| JP | 2010-003509 A | 1/2010 |
| JP | 2010-097950 A | 4/2010 |
| JP | 2010-272439 A | 12/2010 |
| KR | 10-1103398 | 7/2009 |
| KR | 10-2013-0137738 | 12/2013 |
| KR | 10-1394677 | 12/2013 |
| KR | 10-2014-0022072 | 2/2014 |
| KR | 10-1405778 | 6/2014 |

\* cited by examiner

FIG. 1

RELATED ART

OPERATION CONTROL METHOD OF FUEL CELL SYSTEM

CROSS-REFERENCE TO RELATED APPLICATION

This application claims under 35 U.S.C. § 119(a) the benefit of priority to Korean Patent Application No. 10-2015-0077052 filed on Jun. 1, 2015, the entire contents of which are incorporated herein by reference.

BACKGROUND (a) Technical Field

The present invention relates to an operation control method of a fuel cell system. More particularly, the present invention relates to an operation control method of a fuel cell system, which increases the output of a fuel cell stack by detecting and overcoming the cause of a performance limit when the fuel cell stack reaches the performance limit while a fuel cell vehicle is being operated at high altitudes, thereby achieving improved stack performance and vehicle power performance.

(b) Background Art

A fuel cell is an energy conversion device that converts chemical energy stored in fuel into electrical energy via an electrochemical reaction, rather than changing the chemical energy into heat via combustion. Fuel cells may be used to supply industrial, domestic, and vehicular electric power, and also to supply electric power for small electric/electronic products and portable appliances.

The vehicular fuel cell currently being studied is a Polymer Electrolyte Membrane Fuel Cell (PEMFC) having a high electric power density. In the polymer electrolyte membrane fuel cell, a Membrane Electrode Assembly (MEA), which is the main constituent element thereof, is disposed at an innermost position. The membrane electrode assembly includes a solid polymer electrolyte membrane which is capable of moving hydrogen ions, and a cathode (i.e. air pole) and an anode (i.e. hydrogen pole) which are electrode layers on both surfaces of the electrolyte membrane and have a catalyst applied thereto to enable hydrogen and oxygen reactions.

In addition, a Gas Diffusion Layer (GDL) is stacked on the exterior portion of the membrane electrode assembly, i.e. the exterior portion at which the cathode and the anode are located. In turn, bipolar plates are disposed at the exterior of the gas diffusion layer and the bipolar plates form a flow field, through which reaction gas (e.g., hydrogen as fuel gas and oxygen or air as oxidant gas) is supplied, and through which cooling water passes.

For example, a gasket used to seal fluid is stacked to be interposed between the bipolar plates. After stacking a plurality of cells, end plates are coupled at an outermost position to support the cells therebetween. Since each unit cell generates a low voltage, scores to hundreds of cells are stacked in series to increase the voltage. Accordingly, the fuel cell manufactured in the form of a stack is used as a power generating device.

Figure 1:
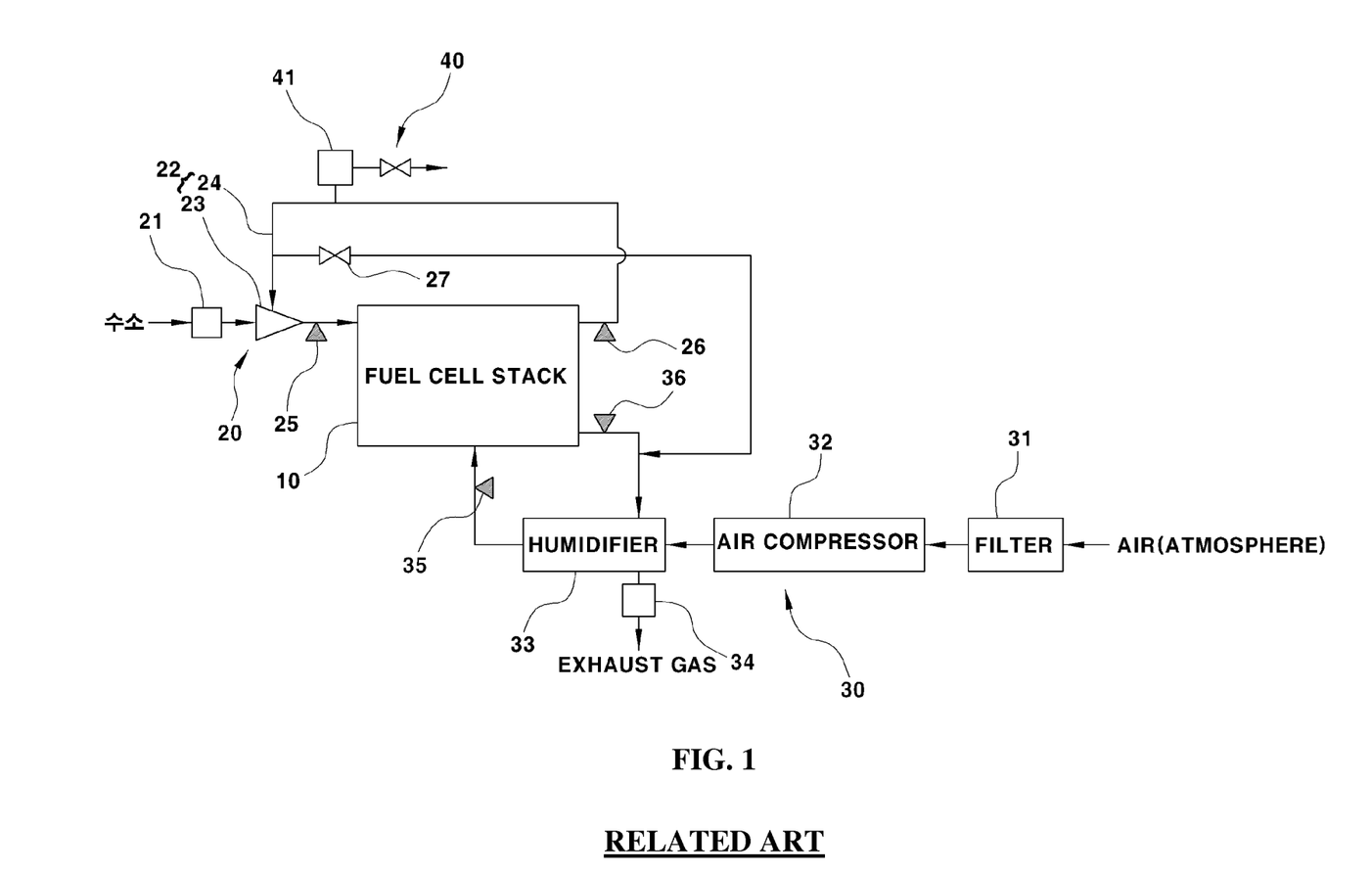
FIG. 1 is a view illustrating the configuration of a high-pressure operating fuel cell system according to the related art.

A fuel cell system to be applied to a fuel cell vehicle is composed of a fuel cell stack and devices that are configured to supply reaction gas. FIG. 1 is a view illustrating the configuration of a fuel cell system according to the related art. As illustrated in FIG. 1, the fuel cell system includes a fuel cell stack 10 configured to generate electricity from the electrochemical reaction of reaction gas, a hydrogen supply device 20 configured to supply hydrogen as fuel to the fuel cell stack 10, an air supply device 30 configured to supply air including oxygen to the fuel cell stack 10, a heat and water management system 40 configured to adjust the operating temperature of the fuel cell stack 10 and perform a water management function, and a fuel cell system controller (not illustrated) configured to operate the fuel cell system.

In the conventional fuel cell system, the hydrogen supply device 20 includes, for example, a hydrogen reservoir (e.g., a hydrogen tank) (not illustrated), a regulator (not illustrated), a hydrogen pressure adjusting valve 21, and a hydrogen recirculation device 22. The air supply device 30 includes, for example, an air blower (for low-pressure operation) or air compressor (for high-pressure operation) 32, a humidifier 33, and an air pressure adjusting valve 34. The heat and water management system includes, for example, an electric water pump (e.g., cooling water pump), a water tank, and a radiator, although not illustrated, as well as a water trap 41.

In the hydrogen supply device 20, high-pressure hydrogen supplied from the hydrogen tank is decompressed to a particular pressure in the regulator, prior to being supplied to the fuel cell stack 10. Accordingly, the decompressed hydrogen is supplied to the fuel cell stack 10 by a controlled supply amount via pressure control based on the operating conditions of the fuel cell stack 10. In other words, hydrogen, having passed through the regulator from the hydrogen tank, is supplied to the fuel cell stack 10 after being adjusted in pressure by the hydrogen pressure adjusting valve 21 at the inlet side of a stack hydrogen pole.

The hydrogen pressure adjusting valve 21 is adjusted to change pressure of the hydrogen, decompressed by the regulator, to be suitable for the stack operating conditions. The controller is configured to operate the hydrogen pressure adjusting valve 21 upon receiving feedback values from two hydrogen pressure sensors 25 and 26 which are installed respectively at the inlet and outlet sides of the stack hydrogen pole.

In addition, the hydrogen remaining after reaction inside the fuel cell stack 10 is discharged through the outlet of the stack hydrogen pole (anode), or is recirculated to the inlet of the stack hydrogen pole by the hydrogen recirculation device 22. The hydrogen recirculation device 22 is a device that increases the reliability of the hydrogen supply and improves the lifespan of the fuel cell. Although there are various recirculation methods, known exemplary methods include a method using an ejector 23, a blower, and both an ejector and a blower.

The hydrogen recirculation device 22 contributes to the reuse of hydrogen by recirculating unreacted hydrogen, remaining after used in the hydrogen pole (anode) of the fuel cell stack 10, to the hydrogen pole through a recirculation pipe 24. In addition, the hydrogen recirculation device 22 increases in the amount of impurities such as, for example, nitrogen, water, and vapor, which are directed to the hydrogen pole through the electrolyte membrane inside the stack of the fuel cell, and cause a reduced amount of hydrogen in the hydrogen pole, resulting in deterioration of reaction efficiency. Therefore, it is necessary to purge the impurities by opening a purge valve 27 at a predetermined period.

In other words, by installing the purge valve 27 for purging hydrogen to a pipe at the outlet side of the hydrogen pole of the fuel cell stack 10 to periodically discharge the hydrogen from the hydrogen pole, impurities such as, for example, nitrogen and water are also discharged and removed, and the rate of use of hydrogen increases.

Discharging the impurities from the fuel cell stack as described above advantageously increases the concentration of hydrogen, increases the rate of hydrogen use, and improves the diffusion and reactivity of gas. In addition, methods of operating the fuel cell system may be generally divided into a low-pressure operation method and a high-pressure operation method. In the respective operation methods, the operating pressure of the fuel cell stack is one of the factors having a predominant effect on the overall performance.

In a low-pressure operating fuel cell system, an air blower is generally used to supply low-pressure air to the air pole (cathode) of the stack. In a high-pressure operating fuel cell system, the air compressor 32 is used to supply higher pressure air to the air pole of the stack. In addition, in the high-pressure operating fuel cell system, the air having passed through a filter 31 is supplied to the air pole of the fuel cell stack 10 using the air compressor 32, and the outlet pressure of the air pole is controlled using a pressure adjustor at the rear end of the stack, i.e. the air pressure adjusting valve 34 mounted to a pipe at the outlet side of the air pole of the stack.

In general, to adjust the operating pressure of the fuel cell system, target values of inlet and outlet pressures of the hydrogen pole and the air pole are determined from an operating pressure control map based on the operating conditions of the fuel cell, and measured values of the hydrogen pressure sensors 25 and 26 and the air pressure sensors 35 and 36 are fed back to be adjusted to the target values for the inlet and outlet pressures of the hydrogen pole and the air pole.

Meanwhile, the cause of deterioration in the performance of a fuel cell system equipped in a fuel cell vehicle at high altitudes may be divided into (1) deterioration in the overall performance of the fuel cell stack due to the reduced operating pressure of an air pole and (2) a reduction in the maximum output of a fuel cell stack.

Among these causes, the deterioration of overall stack performance due to the reduced operating pressure of the air pole may be improved when the pressure of air supplied to the fuel cell stack is increased by supplying compressed air using a high-pressure operating system, i.e. an air compressor. However, the reduction of maximum output may be not be improved by simply applying the high-pressure operating system.

The cause of stack output limit due to the reduction of maximum output may be divided into (a) the insufficient flow rate of air and (b) the introduction of a minimum acceptable voltage due to the deterioration of stack performance. However, the cause may be the insufficient flow rate of air when the stack is good (e.g., no deterioration), and the cause may be the introduction of a minimum acceptable voltage due to the deterioration of stack performance when the deterioration of the stack has proceeded to some extent.

Therefore, there is the demand for an operation control method which is capable of increasing the maximum output of a fuel cell stack by positively determining the state of the stack while the fuel cell system is being operated at high altitudes.

SUMMARY

The present invention provides an operation control method of a fuel cell system, which increases the output of a fuel cell stack by detecting and overcoming the cause of a performance limit when the fuel cell stack reaches the performance limit while a fuel cell vehicle is being operated at high altitudes, thereby achieving improved stack performance and vehicle power performance.

In one aspect, the present invention provides an operation control method of a fuel cell system that may include determining whether an operation state of a fuel cell stack mounted within a fuel cell vehicle corresponds to a predetermined condition in which a stack output limit occurs by detecting current operation state information of the fuel cell stack, and adjusting an operating pressure of an air pole of the fuel cell stack by adjusting an opening degree of an air pressure adjusting valve to a control command value based on the operation state of the fuel cell stack when the operation state of the fuel cell stack corresponds to the predetermined condition in which the stack output limit occurs.

In an exemplary embodiment, the determining and the adjusting may be implemented in response to detecting a high-altitude operation of the fuel cell vehicle in which an atmospheric pressure, detected by an atmospheric sensor of the vehicle, is a set pressure or less. In another exemplary embodiment, the current operation state information of the fuel cell stack may include a revolutions per minute (RPM) of an air compressor configured to supply air including oxygen as oxidant gas to the fuel cell stack and a stack voltage.

Further, when a current stack voltage is greater than a predetermined minimum acceptable voltage but a current RPM of the air compressor is about a predetermined RPM limit by a difference of a set value 1 or less, it may be determined that the operation state of the fuel cell stack is an insufficient air flow rate state corresponding to the condition in which the stack output limit occurs. In response to determining that the operation state of the fuel cell stack is the insufficient air flow rate state corresponding to the condition in which the stack output limit occurs, the opening degree of the air pressure adjusting valve may be increased to a control command value based on the current RPM of the air compressor, to reduce the operating pressure of the air pole of the fuel cell stack.

In addition, when a difference between the current stack voltage and the minimum acceptable voltage is greater than a set value 2 and the current RPM of the air compressor is about the RPM limit by a difference of the set value 1 or less, the insufficient air flow rate state corresponding to the condition in which the stack output limit occurs may be determined. When a current RPM of an air compressor is less than a predetermined RPM limit and a current stack voltage is about a predetermined minimum acceptable voltage by a difference of a set value 2 or less, it may be determined that the operation state of the fuel cell stack corresponds to the condition in which the stack output limit occurs.

In another exemplary embodiment, in response to determining that the operation state of the fuel cell stack corresponds to the condition in which the stack output limit occurs, the opening degree of the air pressure adjusting valve may be reduced to a control command value based on the current stack voltage, to increase the operating pressure of the air pole of the fuel cell stack. When a difference between the current RPM of the air compressor and the RPM limit is greater than a set value 1 and the current stack voltage is about (e.g., approximately) the minimum acceptable voltage by a difference of the set value 2 or less, it may be determined that the operation state corresponds to the condition in which the stack output limit occurs.

BRIEF DESCRIPTION OF THE DRAWINGS

The above and other features of the present invention will now be described in detail with reference to exemplary

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an operation control method of a fuel cell system, which increases the output of a fuel cell stack and achieves the maximum output of the fuel cell stack by detecting and overcoming the cause of a performance limit when the fuel cell stack reaches the performance limit at high altitudes.

In the present invention, first, whether a fuel cell vehicle is being operated at high altitudes may be detected. When high-altitude operation is detected, whether the operation state of a fuel cell stack corresponds to a stack output limit condition (i.e. the condition in which stack output limit may occur) may be determined. Thereafter, when corresponding to the stack output limit condition, the operation control of a fuel cell system may be performed to increase the output of the fuel cell stack.

As described above, the cause of deterioration in the maximum output of the stack and the stack output limit while the fuel cell vehicle is being operated at high altitudes may be (1) the insufficient flow rate of air supplied as reaction gas to the stack and (2) the introduction of a minimum acceptable voltage of the stack due to the deterioration of stack performance. When there is a likelihood that maximum output limit occurs due to the insufficient flow rate of air, increasing the flow rate of air by reducing the operating pressure of an air pole may increase stack current, thereby achieving the maximum output of the stack. In addition, when there is a likelihood of the introduction of a minimum acceptable voltage of the stack due to the deterioration of stack performance, increasing the operating pressure of the air pole may increase the stack voltage, thereby achieving the maximum output of the stack.

Accordingly, in the present invention, the operation state of the fuel cell stack, i.e. whether the flow rate of air is insufficient and whether the minimum acceptable voltage has been reached, may be detected based on stack output limit during high-altitude operation. When the cause of the stack output limit is the insufficient flow rate of air, the operating pressure of the air pole may be reduced to increase the flow rate of air. When the cause of the stack output limit is the introduction of a minimum acceptable voltage, the operating pressure of the air pole may be increased to increase the stack voltage.

Figure 2:
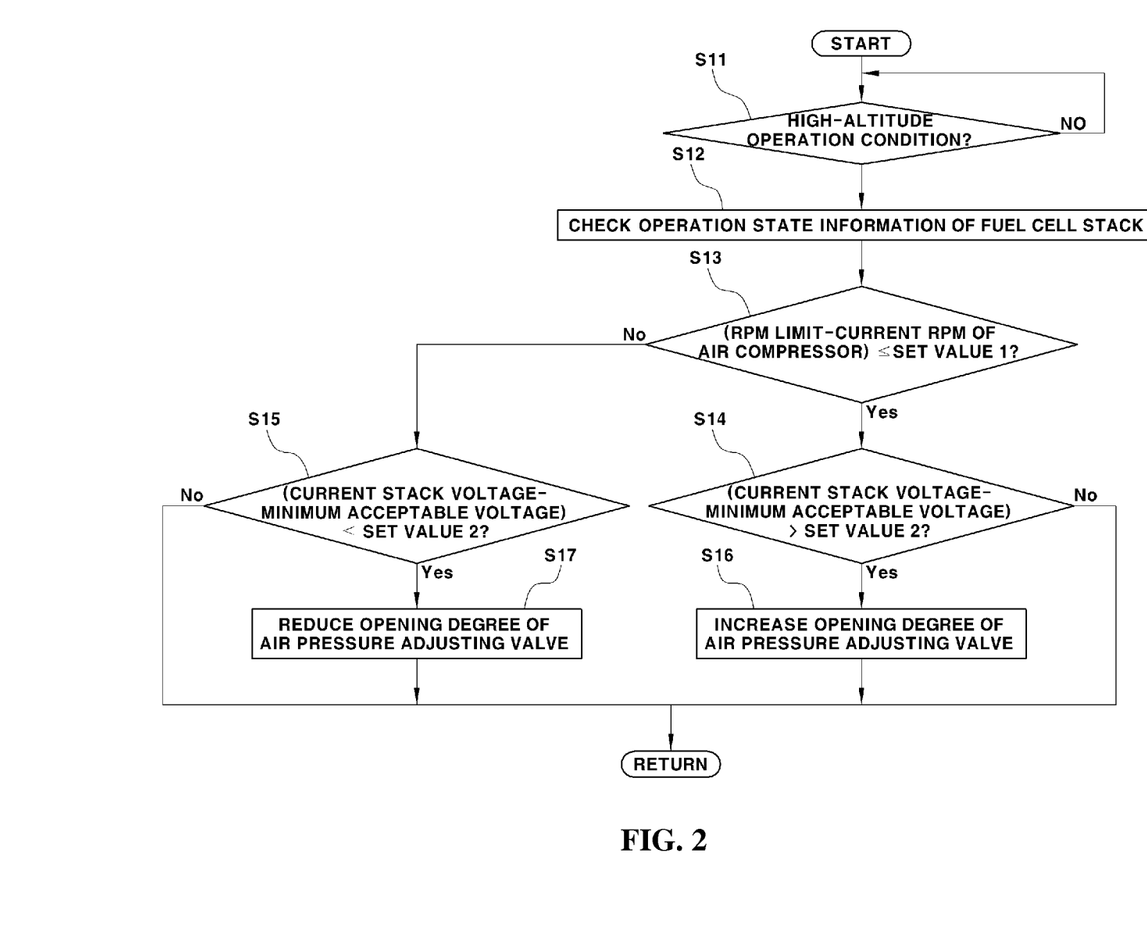
FIG. 2 is a flowchart illustrating an operation control method of a fuel cell system according to an exemplary embodiment of the present invention.

FIG. 2 is a flowchart illustrating an operation control method of a fuel cell system according to an exemplary embodiment of the present invention. The following Table 1 shows an operation control method for overcoming output limit and increasing stack output based on the cause of the output limit when the maximum output is limited.

TABLE 1

| Classification | Type of Output Condition (occurs = 1, does not occur = 0) | | | |
| --- | --- | --- | --- | --- |
| | Case #1 | Case #2 | Case #3 | Case #4 |
| Close to Minimum Acceptable Stack Voltage | 0 | 1 | 1 | 0 |
| Close to RPM Limit of Air compressor | 1 | 0 | 1 | 0 |
| Operation Control Strategy | Increase the opening degree of air pressure adjusting valve → reduction in operating pressure of air pole, increase in the flow rate of air | Reduce the opening degree of air pressure adjusting valve → reduction in operating pressure of air pole, increase in stack voltage | Maintain current state | |

First, the controller may be configured to determine whether the operation condition of the fuel cell vehicle is a high-altitude operation condition (S11). When the atmospheric pressure, detected by an atmospheric pressure sensor of the vehicle, is a set pressure or less, the controller may be configured to determine that the operation condition corresponds to the high-altitude operation condition.

Subsequently, the controller may be configured to determine the operation state information of the fuel cell stack under the high-altitude operation condition (S12), thereby determining whether the operation state of the fuel cell stack corresponds to the stack output limit condition, i.e. the condition in which stack output limit may occur. At this time, the current RPM of an air compressor, which supplies compressed air, i.e. oxidant gas to the fuel cell stack, and the stack voltage may be determined as the operation state information (S13, S14 and S15).

Particularly, when the current stack voltage is greater than a predetermined minimum acceptable voltage (i.e. the difference between the stack voltage and the minimum acceptable voltage is greater than a set value 2), and the current RPM of the air compressor is approximately a predetermined RPM limit (i.e. the difference between the current RPM and the RPM limit is a set value 1 or less), the controller may be configured to determine that the operation state of the fuel cell stack is the stack output limit condition, i.e. the condition in which the flow rate of air is insufficient.

Accordingly, to overcome the insufficient flow rate of air and achieve a sufficient air flow rate, the controller may be configured to increase the opening degree of the air pressure adjusting valve based on the current RPM of the air compressor, thereby reducing the operating pressure of the air pole and, consequently, increasing the flow rate of air supplied to the fuel cell stack (S16).

In contrast, when the current RPM of the air compressor is less than the predetermined RPM limit (i.e. the difference between the current RPM and the RPM limit is greater than the set value 1), and the current stack voltage is approximately the predetermined minimum acceptable voltage (i.e. the difference between the stack voltage and the minimum acceptable voltage is the set value 2 or less), the controller may be configured to determine that the operation state of the fuel cell stack is the stack output limit condition, i.e. the condition in which the minimum acceptable voltage has been reached. Accordingly, to increase the stack voltage, the controller may be configured to reduce the opening degree of the air pressure adjusting valve based on the current stack voltage, thereby increasing the operating pressure of the air pole (S17).

In Table 1, Case #3 represents the state in which the current RPM of the air compressor reaches a level approximate to the RPM limit (i.e. the difference between the current RPM and the RPM limit is the set value 1 or less) and the minimum acceptable voltage of the stack has been reached (i.e. the difference between the stack voltage and the minimum acceptable voltage is the set value 2 or less). In particular, the current state may be maintained since electric power generation in which the stack generates current to a level approximate to the minimum acceptable voltage is implemented and, simultaneously, the stack may be operated at the maximum performance until the performance of the air compressor is approximately the performance limit.

Furthermore, when the flow rate of air is insufficient or the minimum acceptable voltage has been reached, the opening degree of the air pressure adjusting valve may be adjusted as described above to increase or decrease the operating pressure of the air pole. Accordingly, the stack output limit condition, i.e. the condition in which the stack output limit may occur may be overcome and, consequently, the output of the stack may be increased to become the state of Case #3 or Case #4 of Table 1. The stack output limit condition of Case #1 or Case #2 of Table 1 may occur, for example, when there is the demand for rapid acceleration as the driver rapidly engages an acceleration pedal (e.g., exerts pressure onto the pedal) under the high-altitude operation condition.

Figure 3A:
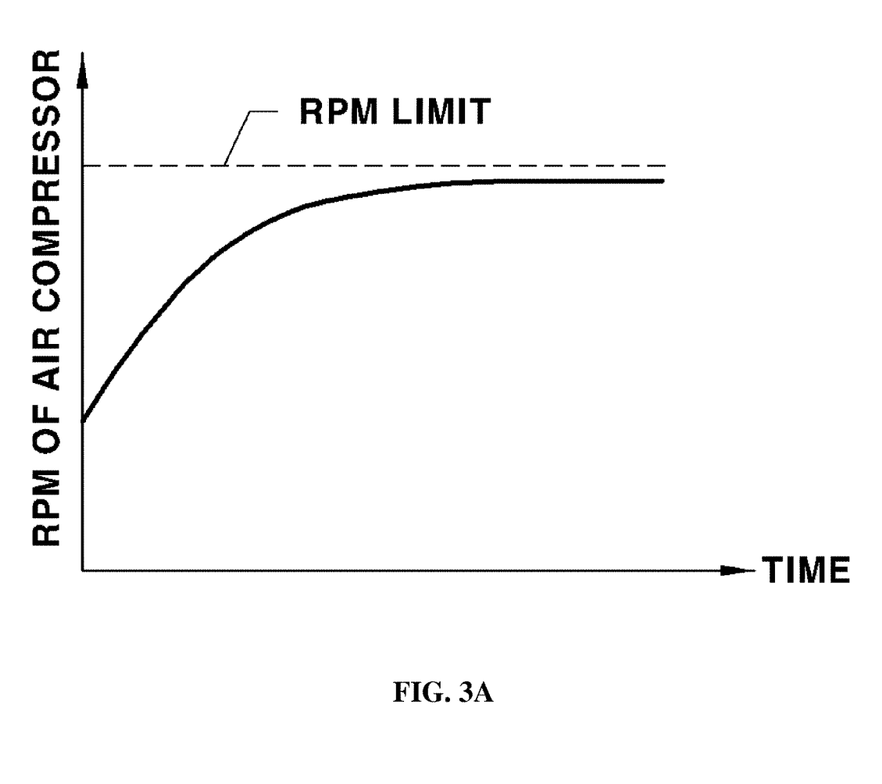
FIGS. 3A-3C are views illustrating an operation control method of the present invention when there is a likelihood that stack output limit occurs due to the insufficient flow rate of air according to an exemplary embodiment of the present invention.
Figure 3B:
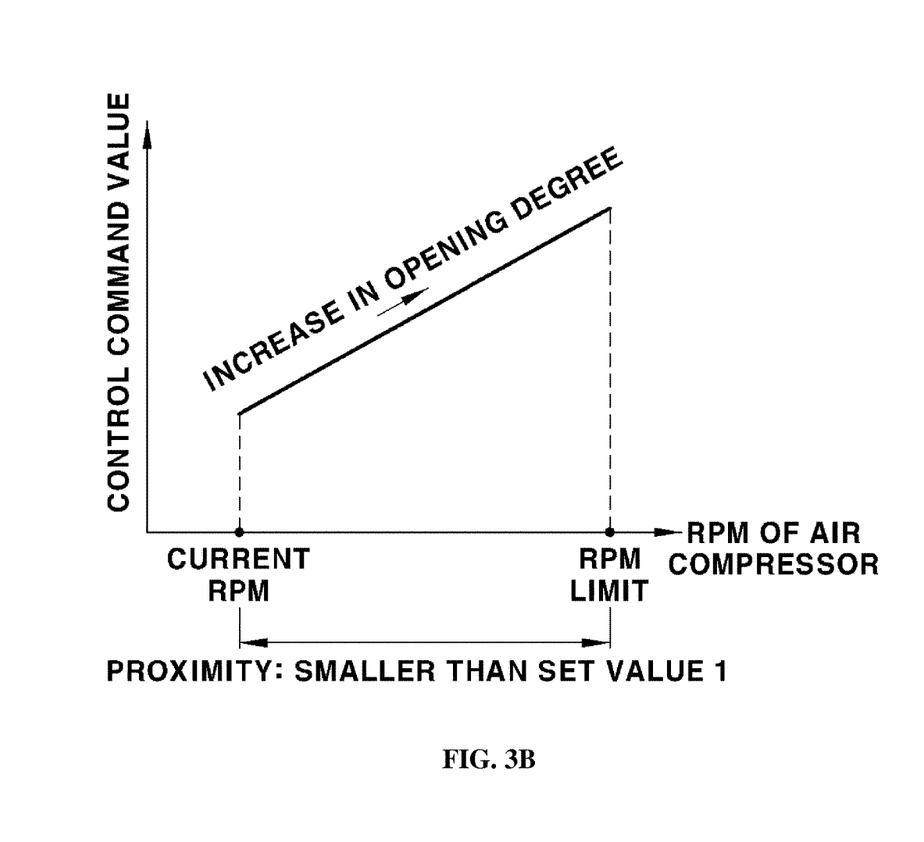
Figure 3C:
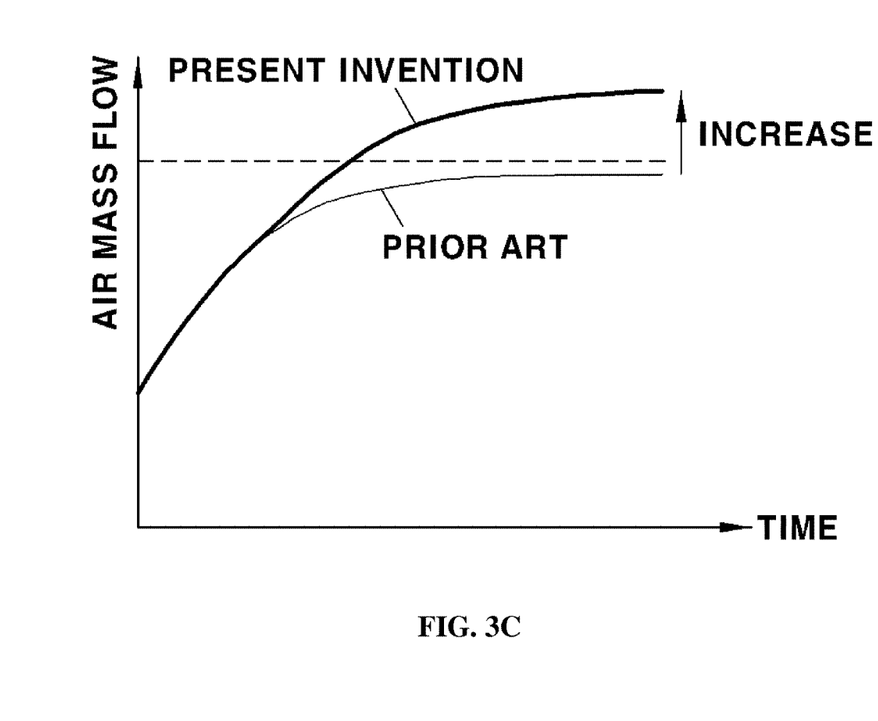

FIGS. 3A-3C illustrate the case where the operation state of the stack reaches the stack output limit level corresponding to Case #1 of Table 1. As illustrated in FIG. 3A, the controller may be configured to determine a valve control command value based on the current operation state of the stack when the RPM of the air compressor is about the same as the RPM limit in response to, for example, the rapid acceleration demand. Particular, the controller may be configured to determine the valve control command value based on the RPM using a control map as illustrated in FIG. 3B from the current RPM of the air compressor which represents the current operation state of the stack, and may be configured to operate the air pressure adjusting valve based on the determined control command value.

Further, since the operating pressure of the air pole may be reduced by increasing the opening degree of the valve and, consequently, the flow rate (e.g., mass flow rate) of air may be increased as illustrated in FIG. 3C, stack current may be increased by achieving the sufficient flow rate of air, which enables an increase in the output of the stack and the acquisition of maximum output by the increased current.

Figure 4A:
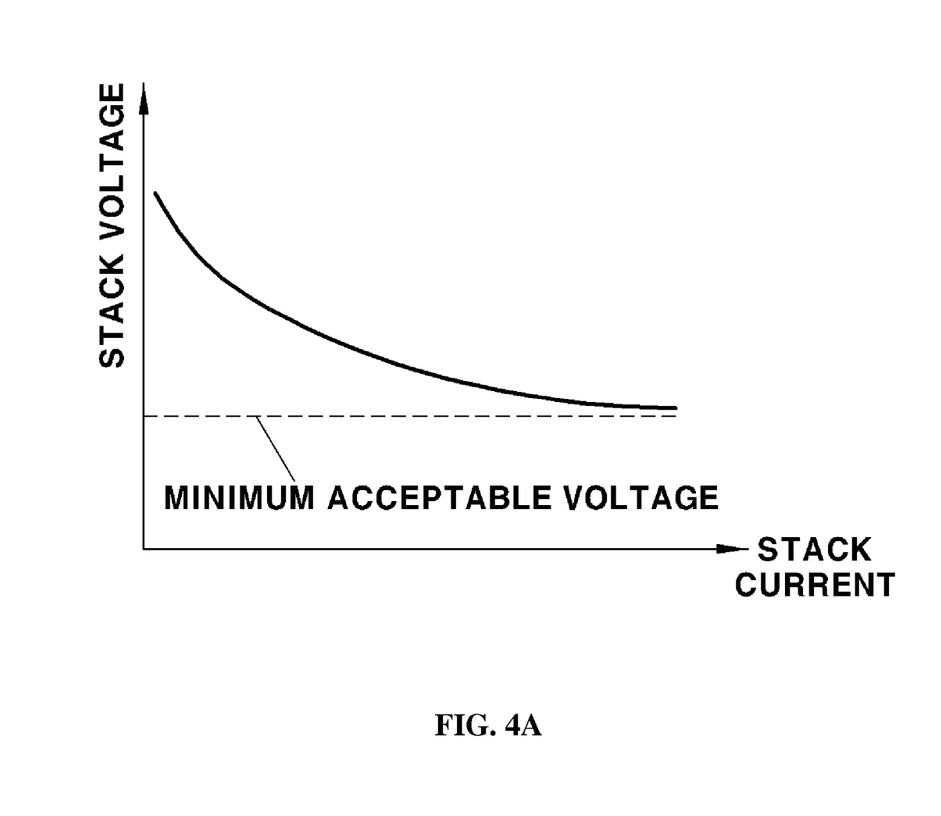
FIGS. 4A-4C are views illustrating an operation control method of the present invention when there is a likelihood that stack output limit occurs due to the introduction of a minimum acceptable voltage of the stack according to an exemplary embodiment of the present invention.
Figure 4B:
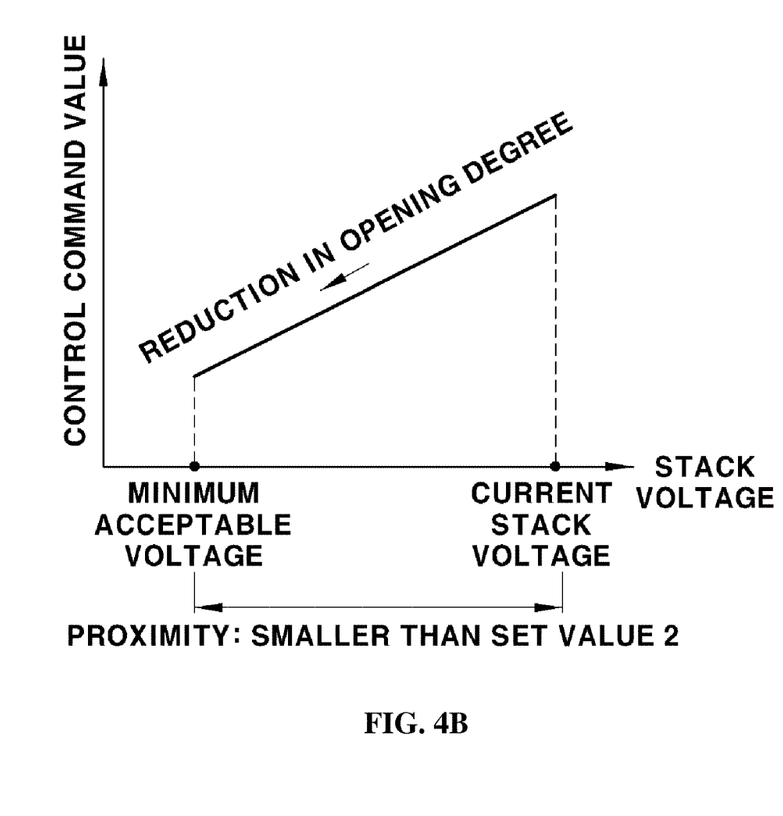
Figure 4C:
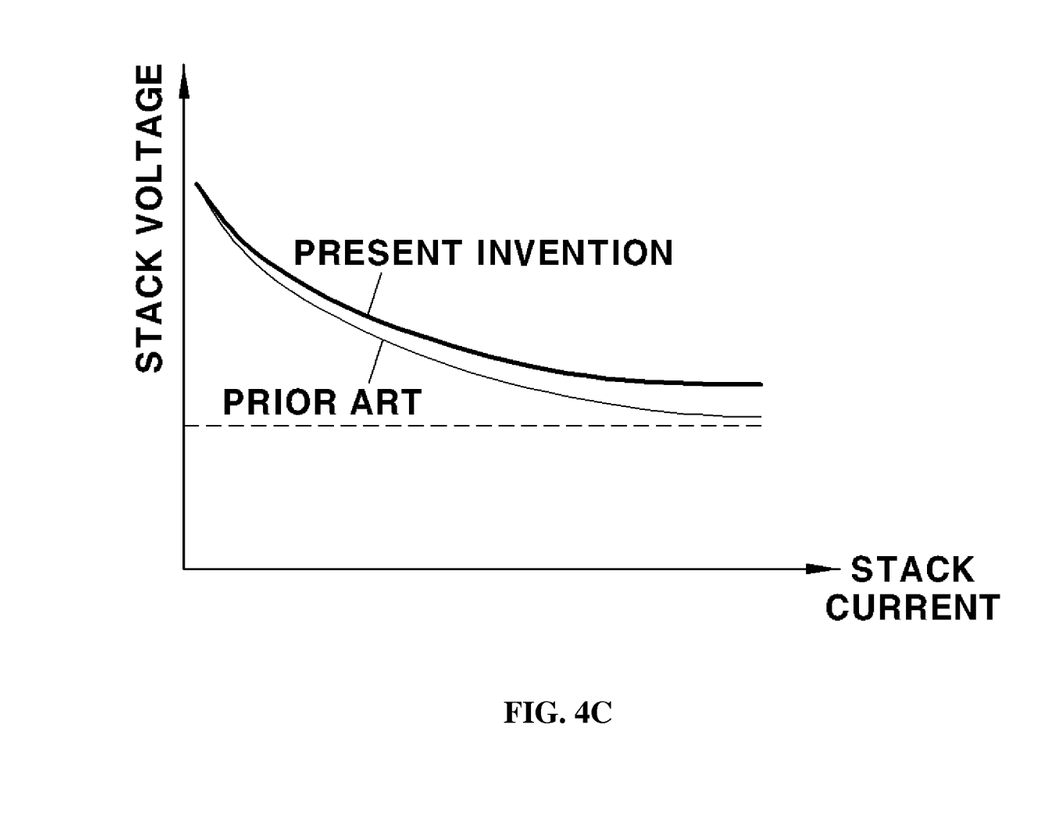

FIGS. 4A-4C illustrate the case where the operation state of the stack reaches the stack output limit level corresponding to Case #2 of Table 1. As illustrated in FIG. 4A, the controller may be configured to determine a valve control command value based on the current operation state of the stack when the stack voltage is reduced to be about the same as the minimum acceptable voltage level.

In particular, the controller may be configured to determine the valve control command value based on the stack voltage using a control map as illustrated in FIG. 4B from the stack voltage which represents the current operation state of the stack, and may be configured to operate the air pressure adjusting valve based on the determined control command value. Since the operation pressure of the air pole may be increased by reducing the opening degree of the valve and the stack voltage may be increased as illustrated in FIG. 4C, the output of the stack may be increased and the maximum output may be acquired.

As is apparent from the above description, in an operation control method of a fuel cell system according to an exemplary embodiment of the present invention, the condition in which stack output limit may occur may be detected from the operation state of a fuel cell stack. When there is a likelihood of the occurrence of the output limit, the operation of the system may be controlled to overcome the cause of the occurrence of the output limit and to acquire the maximum output of the stack.

In particular, to overcome the stack output limit due to the insufficient flow rate of air which is the condition in which the stack output limit may occur, when the RPM of the air compressor is about the same as the RPM limit, the operating pressure of an air pole may be reduced by increasing the opening degree of an air pressure adjusting valve and, consequently, the stack output may be increased via the acquisition of the increased flow rate of air.

Additionally, to prevent the stack output limit caused when the stack voltage has reached at the minimum acceptable voltage, when the stack voltage is about the same as (e.g., approximately) the minimum acceptable voltage, the operating pressure of the air pole may be increased by reducing the opening degree of the air pressure adjusting valve and, consequently, the stack output may be increased via the increased stack voltage.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An operation control method of a fuel cell system, comprising:
   determining, by a controller, whether an operation state of a fuel cell stack mounted within a fuel cell vehicle corresponds to a predetermined condition in which a stack output limit occurs by determining current operation state information of the fuel cell stack;
   adjusting, by the controller, an operating pressure of an air pole of the fuel cell stack by adjusting an opening degree of an air pressure adjusting valve to a control command value based on the operation state of the fuel cell stack when the operation state of the fuel cell stack corresponds to the predetermined condition in which the stack output limit occurs, wherein the current operation state information of the fuel cell stack includes a revolutions per minute (RPM) of an air compressor configured to supply air including oxygen as oxidant gas to the fuel cell stack and a stack voltage; and
   determining, by the controller, whether the operation state of the fuel cell stack corresponds to the predetermined condition in which the stack output limit occurs based on a current RPM of the air compressor, and a predetermined RPM limit of the air compressor, a current stack voltage and a predetermined minimum acceptable voltage.

2. The operation control method of claim 1, wherein the determining and the adjusting are implemented in response to determining a high-altitude operation of the fuel cell vehicle in which an atmospheric pressure, detected by an atmospheric sensor of the vehicle, is a set pressure or less.

3. The operation control method of claim 1, further comprising:
   determining, by the controller, that the operation state of the fuel cell stack is an insufficient air flow rate state corresponding to the condition in which the stack output limit occurs when the current stack voltage is greater than the predetermined minimum acceptable voltage, and the current RPM of the air compressor is about the redetermined RPM limit by a difference of a set value 1 or less.

4. The operation control method of claim 3, further comprising:
   in response to determining that the operation state of the fuel cell stack is the insufficient air flow rate state corresponding to the condition in which the stack output limit occurs, increasing, by the controller, the opening degree of the air pressure adjusting valve to a control command value based on the current RPM of the air compressor to reduce the operating pressure of the air pole of the fuel cell stack.

5. The operation control method of claim 3, further comprising:
   determining, by the controller, that the operation state of the fuel cell stack is the insufficient air flow rate state corresponding to the condition in which the stack output limit occurs when a difference between the current stack voltage and the minimum acceptable voltage is greater than a set value 2 and the current RPM of the air compressor is about the RPM limit by a difference of the set value 1 or less.

6. The operation control method of claim 1, further comprising:
   determining, by the controller, that the operation state of the fuel cell stack corresponds to the condition in which the stack output limit occurs when a current RPM of the air compressor is less than a predetermined RPM limit and a current stack voltage is about a predetermined minimum acceptable voltage by a difference of a set value 2 or less.

7. The operation control method of claim 6, further comprising:
   in response to determining that the operation state of the fuel cell stack corresponds to the condition in which the stack output limit occurs, decreasing, by the controller, the opening degree of the air pressure adjusting valve to a control command value based on the current stack voltage to increase the operating pressure of the air pole of the fuel cell stack.

8. The operation control method of claim 6, further comprising:
   determining, by the controller, that the operation state of the fuel cell stack corresponds to the condition in which the stack output limit occurs when a difference between the current RPM of the air compressor and the RPM limit is greater than a set value 1 and the current stack voltage is about the minimum acceptable voltage by a difference of the set value 2 or less.

* * * * *